Feb. 5, 1952 — W. G. STEVENSON ET AL — 2,584,166
SUPPOSITORY
Filed May 25, 1948
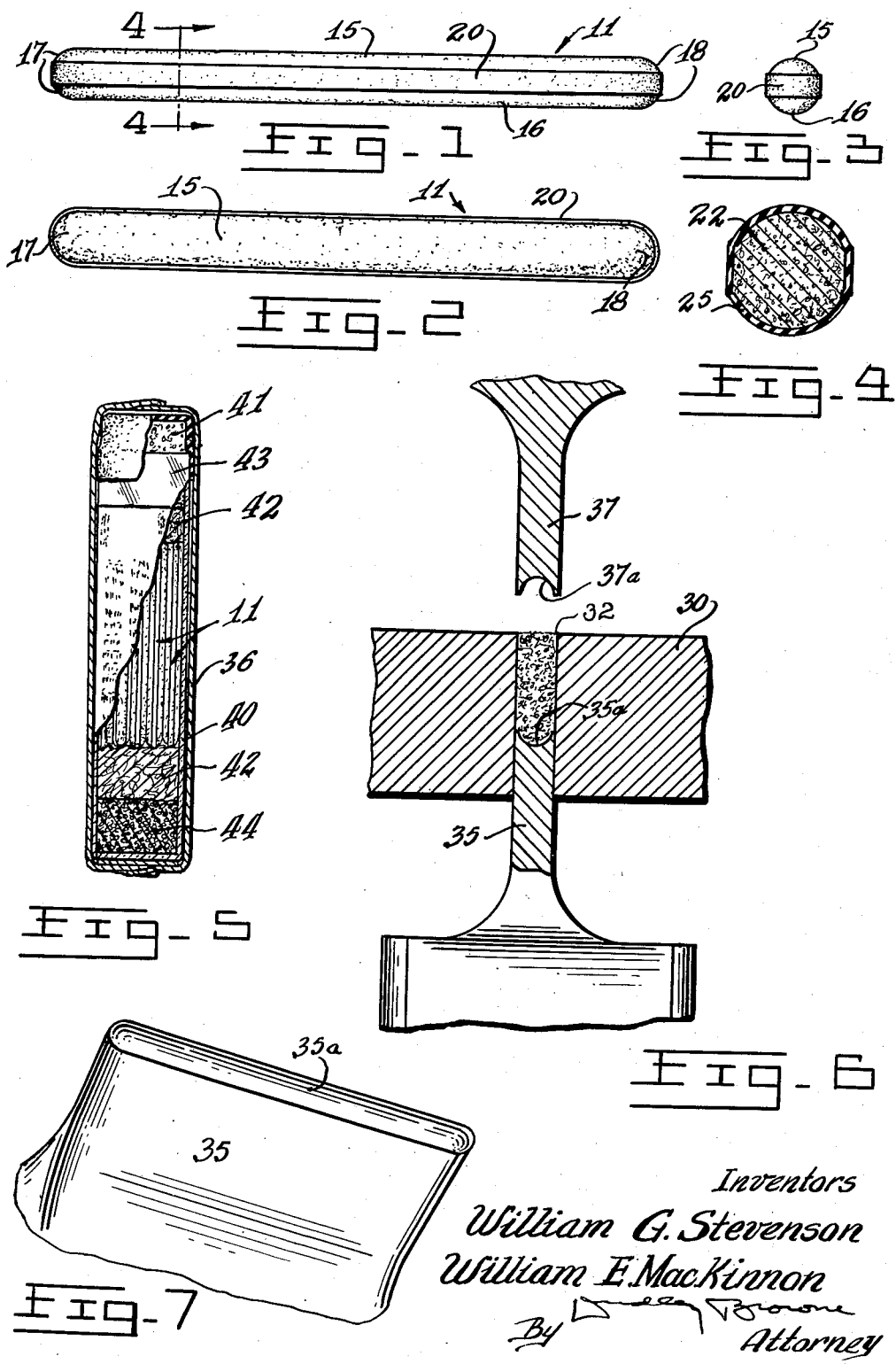
Inventors
William G. Stevenson
William E. MacKinnon
By [signature]
Attorney Patented Feb. 5, 1952

2,584,166

UNITED STATES PATENT OFFICE 2,584,166

SUPPOSITORY

William G. Stevenson, Lakeside, Quebec, and William E. MacKinnon, Montreal, Quebec, Canada, assignors to Ayerst, McKenna & Harrison Limited, St. Laurent, Quebec, Canada, a corporation of Canada Application May 25, 1948, Serial No. 29,058

10 Claims. (Cl. 167—64)

INTRODUCTION

This invention relates to a medicated bougie.

These articles are slender elongated rod-like suppositories adapted to be inserted into restricted orifices of the human or animal body. For example, bougies are used for insertion into the urethra of human beings for the treatment of genito urinary infections. They are also used for insertion into the teat canal of domestic animals, for example cows, for the treatment of mastitis.

The articles have been made from different substances designed either to melt at body temperature or else to dissolve in the secretions. The present invention deals with the soluble type. These have generally been made from mouldable substances like waxes or from compressible water-soluble substances, for example carbohydrates like lactose, starch and acacia.

There are certain requirements for a bougie, particularly when used in the preferred application of the present invention, i. e. for treating mastitis in cows. It must be sufficiently slender for insertion into the teat canal past the sphincter muscles. It must, at the same time, be of sufficient volume to contain enough of the medicament to act effectively against the infecting organisms. This means that there is a minimum effective length because of the small cross-sectional area. And, the article must have a breaking strength sufficiently high to enable satisfactory insertion under practical conditions. The material from which the vehicle material or carrier for the medicament is made must be solubie in the secretions and at the same time must be non-reactive with the medicament which is to carry. In the case of certain medicaments, the moisture content of the vehicle material must be low to avoid deterioration of a medicament, for example in the case of penicillin, which is moisture labile. The vehicle material must also be non-toxic and non-irritating to the delicate tissues in contact with which it is to come. Finally, the bougie must be so constructed suitably for mass production economically and aseptically in large quantities.

Most prior art devices have one or another disadvantage which prevents them from meeting the requirements just outlined.

THE APPLICANTS' DEVELOPMENT

The applicants have now discovered that a bougie meeting all the above requirements can be made by dry pressure moulding from a vehicle essentially of dry fine-particled material which either in its normal state or in precompressed condition is substantially free-flowing, and within which the medicament is dispersed. The applicants have found that sorbitol has unique and unexpected characteristics when used as as a vehicle material in making bougies as described.

Preferably, the body of the bougie is made up of sorbitol, a mould lubricant, and the medicament. It may be desirable to substitute for part of the sorbitol an excipient, for example starch or a sugar, for instance, lactose. Preferred mould lubricants are calcium stearate, magnesium sterate or aluminum stearate. In preparing the bougie, the sorbitol and the medicament are compounded together to form a tabletting mix and the bougies are punched out on a tabletting press equipped with specially shaped punches.

The applicants also prefer to provide the bougies with a thin coating of film of a material soluble in the body secretions which serves as a lubricant and also as a protective coating to the sugar vehicle. Preferred materials for this purpose are the polyethylene glycols sold under the trade-mark "Carbowax," particularly those having a high viscosity such as the "1500" to the "6000." The application of these lubricating substances can be conveniently effected by dipping.

Various medicaments may be employed. The applicants prefer to use penicillin salts, particularly the calcium or potassium. Crystalline and amorphous types may be used with crystalline preferred. Other antibiotics which are non-irritating to the mucous membrane and non-toxic can be employed, for example, streptomycine. Among other possible medicaments are tyrothrycin, the sulfa drugs such as sulfapyridine, sulfadiazine and sulfanilamide; acridine dyes such as acroflavin, quaternary ammonium compounds, mercurials, organic silver preparations such as argyrol, organic silver preparations, and iodine. It will be understood, of course, that the concentration must be selected to be non-irritating to the sensitive tissues which are sufficiently bacteriostatic or bactericidal to have a favourable effect in the course of the disease. Combinations of a plurality of medicaments may be employed, especially combinations such as those disclosed in co-pending application Serial No. 623,612 now abandoned.

The quantitive amount will vary in the case of each medicinal agent. In the case of penicillin in the form of a non-toxic salt such as the calcium or sodium, for example, from about 5000 to about 60,000 units are effective in suppositories of the dimensions described herein.

The preferred dimensions of the bougie are as follows:

Length—from about 1 to about 10 cm.
Cross-sectional dimension—from about 1 to about 5 mm.
Weight—from about 75 mg. to about 1200 mg.
Medicament depending on potency in the case of penicillin—from about 5000 to about 25,000 units (International or Oxford)
Moisture content—less than about 1%

The finished bougies are preferably packed in a water and moisture impermeable tube, e. g. glass tube containing several bougies. Desirably, the tube also contains a desiccant to absorb any moisture and lessen the possibility of deteriorating the medicament.

The application of the bougie in clinical or veterinary use will be well understood by those skilled in the art.

DETAILED DESCRIPTION

In order to illustrate the invention more fully, reference will now be made to the accompanying drawings in which there is illustrated a preferred embodiment of a bougie according to the invention and a preferred apparatus for making this bougie, and in which:

Figure 1 is an enlarged side elevation of a bougie in accordance with the invention.

Figure 2 is a top plan view of the bougie shown in Figure 1.

Figure 3 is an end elevation of the bougie shown in Figures 1 and 2.

Figure 4 is an exaggerated cross-section along the line 4—4 of Figure 1.

Figure 5 is an elevation partly in section of a glass container enclosing several bougies in accordance with the invention.

Figure 6 is a vertical cross-section through a tabletting press constructed in accordance with the present invention and capable of pressing out bougies such as those shown in Figures 1 to 4.

Figure 7 is a perspective view of one of the punches of the tablet press of Figure 6.

Referring more particularly to the drawings, the bougie is essentially an elongated slender rod 11 which in cross-sectional area is made up of a pair of spaced apart segments intervened by a rectangle and has somewhat the over-all appearance of a sarcophagus or elongated tablet. Thus, the rod is provided with the arcuate top and bottom faces 15 and 16 rounded as at 17 and 18 preferably at each end. Intervening the arcuate faces is a substantially flat face or band 20 which extends lengthwise along each side of the rod and continues around the end to meet the band at the other side.

The body of the rod is made up essentially of a normally free-flowing (or precompressed to render free-flowing) fine particled sorbitol, a medicament and a mould lubricant, and if desired, an excipient material, the body having been compressed under relatively high pressure into a solid self-sustaining mass 22. The body in the preferred form is coated with a thin film 25 of a milk soluble lubricating material, preferably a wax, for example polyethylene glycol.

The strength of the bougie is conveniently measured by a test in which it is retained in a vise and a weight is suspended from it, usually one inch from the point of retention. This gives a breaking strength figure which is an approximation of the breaking strength required in practice. The applicants prefer a bougie having a breaking strength such that it will support at least 60 grams when the rod is retained in a vise in a horizontal position and the weight is suspended at one inch from the point of retention. It will be recognized, of course, that the length of the bougie is tied up to some extent with the amount of medicament. It is necessary for high potency bougies to be longer so as to contain more medicament. The applicants prefer for high potency bougies a length of around 43 mm.

APPARATUS

Figure 6 of the drawings shows in fragmentary cross-section the die and punch combination of a conventional pharmaceutical tabletting machine modified in accordance with the invention. Within a die 30 having a suitable elongated aperture 32, there operates a lower punch and ejector member 35 and an upper punch 37. The lower punch 35 is adapted to be set at the desired position within the die (depending on the amount of material to be compressed into each article) and also acts to eject the compressed bougie from the die. The upper and lower punches 35 and 37 are, in accordance with the present invention, elongated in a lateral direction and substantially of the conformation shown in the drawings, particularly Figures 6 and 7, having indentations 35a and 37a of a special shape to give the curved outer faces of the bougie as illustrated in Figures 1 to 4.

The feeding of the moulding material is adjusted in the well-known manner to provide the desired content for each bougie and the movement of the punches adjusted as described above to give the desired pressure.

The press is operated in the well-known manner to make a bougie at each stroke of the press. The bougie is automatically ejected by the foot 35 and a fresh batch of powder fed for each stroke of the press. With multiple presses employing this principle, a large number of bougies can be made at one stroke of a punch-mounting member carrying a number of punches or in a similar apparatus in which a number of punches work at the same time or in rapid sequence.

The finished article has all the characteristics described above as being desirable in a bougie. It is unusual in the sense that it is made from a normally dry free-flowing material. Usually one would not expect to be able to press-mould an elongated article of this nature having sufficient length and at the same time sufficient strength for use as a bougie. Sorbitol has the unique characteristic that it is capable of cohesion when subjected to pressure in the manner described.

Figure 5 illustrates a convenient form in which the bougies may be packaged for sale. This container is made up of a bottle 40 having a cork or other suitable closure 41 and sealed by wax or other suitable agent 42. Inside the container is a desiccant material 44 adapted to absorb any moisture which may be entrained in the atmosphere in the container. Pads 42 and 43 for example of absorbent cotton intervene the bougies 11 which are included to the capacity of the container. A paper envelope 36 is provided for the bottle.

Example

In order that the invention may be carried out and understood in more detail, a specific example will now be given in which a preferred bougie and its method of manufacture is described in detail.

The analysis of the bougie was substantially as follows:

Dimensions

Length—43 mm.
Cross-sectional width—approximately 2.5 mm.
Thickness of wax coating—0.05 to 0.0125 mm.

Shape

Sarcophagal or elongated tablet-shaped

Constituents

Sorbitol—390 mg.
Calcium penicillin (crystalline)—25,000 International or Oxford units
Calcium stearate—25 mg.
"Carbowax 4000"—25 mg.

Physical characteristics

Breaking strength when measured in accordance with test described herein when bougie is retained in a vise and weight is suspended from bougie one inch from point of retention—90 grams
Moisture content finished bougie—less than 1%

MANUFACTURE

Bougies according to these specifications were made up as follows. The penicillin and calcium stearate were mixed and sifted through a number 100 sieve. The sorbitol was sifted through a number 30 sieve and was then mixed with the penicillin etc. and the whole sifted through a number 30 sieve. The resulting sieved mixture was then compressed on a 12 ton tabletting press. In some cases it may be necessary or desirable to pre-compress the final mixture to a number 30 granule before tabletting.

ADVANTAGES

Bougies made according to the present invention have all the characteristics described in the preamble of the specification as being requisite to a satisfactory article. At the same time they possess the unique characteristic of being made of a dry powdered material, dry-pressed to have the necessary strength and other characteristics for the purposes described.

The sub-titles used throughout the specification are merely to simplify reference thereto and should otherwise be disregarded.

We claim:

1. A bougie consisting of dry free-flowing comminuted material compressed into the form of an elongated rod, comprising a medicament and a major amount of sorbitol.

2. A bougie, according to claim 1, having an exterior thin coating of a high viscosity water-soluble polyethylene glycol.

3. A bougie, according to claim 1, wherein the medicament is a penicillin salt.

4. A bougie, according to claim 1, wherein the sorbitol is present in excess of 95% by weight of the body.

5. A bougie consisting of dry free-flowing comminuted material compressed into the form of an elongated rod, comprising a medicament, a mould lubricant and a major amount of sorbitol.

6. A bougie, according to claim 5, wherein the medicament is a penicillin salt.

7. A bougie, according to claim 5, having an exterior thin coating of a high viscosity water-soluble polyethylene glycol.

8. A bougie particularly adapted to the treatment of bovine mastitis consisting of a rigid elongated rod weighing at least 75 mg. and having a length at least 10 times its diameter and composed of dry, free-flowing, compressed comminuted material soluble in the secretions of the mammary glands, said rod comprising as the effective binding agent a major amount of sorbitol and distributed therethrough a dosage unit effective to combat mastitis.

9. A bougie as defined in claim 8 in which the dosage unit comprises 25,000 units of penicillin.

10. A bougie comprising a long slender rod of substantially cylindrical form and having a diameter in the neighbourhood of 2.5 millimeters, said rod having been pressed from a composition made up of dry powdered material containing a medicament and a major amount of sorbitol, said composition in compressed form being soluble in the secretions of the mammary glands, said rod being at least 1 centimeter in length, said rod having a breaking strength equivalent to at least 60 grams when a rod of the same cross-sectional dimension is retained securely in a horizontal position at one point and a weight suspended from it one inch from the point of retention.

W. G. STEVENSON.
WILLIAM E. MacKINNON.

REFERENCES CITED

The following references are of record in the file of this patent:

UNITED STATES PATENTS

| Number | Name | Date |
|---|---|---|
| 398,085 | Schmelz | Feb. 19, 1889 |
| 2,149,005 | Bockmuhl | Feb. 28, 1939 |
| 2,321,694 | Miller | June 15, 1943 |
| 2,498,374 | Martin | Feb. 21, 1950 |

FOREIGN PATENTS

| Number | Country | Date |
|---|---|---|
| 208,252 | Switzerland | Apr. 1, 1940 |

OTHER REFERENCES

Drug and Cosmetic Industry—Oct. 1945, page 532, Amer. J. Pharmacy—April 1941, pp. 134–138.